(12) United States Patent
Puri et al.

(10) Patent No.: US 7,440,909 B2
(45) Date of Patent: Oct. 21, 2008

(54) METHODS AND SYSTEMS ENABLING THE IDENTIFICATION OF ACTUAL COSTS IN A TRANSACTION BASED FINANCIAL AND MANUFACTURING ENVIRONMENT

(75) Inventors: Arvind Nath Puri, Pleasanton, CA (US); Deepak Vij, San Jose, CA (US); Galina Atlas Patil, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 902 days.

(21) Appl. No.: 09/235,120

(22) Filed: Jan. 21, 1999

(65) Prior Publication Data

US 2002/0069103 A1 Jun. 6, 2002

(51) Int. Cl.
*G06Q 40/00* (2006.01)

(52) U.S. Cl. .............................. 705/11; 705/22; 705/23; 705/24; 705/30

(58) Field of Classification Search .................. 705/11, 705/22, 23, 24, 30
See application file for complete search history.

(56) References Cited

U.S. PATENT DOCUMENTS

| | | | |
|---|---|---|---|
| 4,918,602 A * | 4/1990 | Bone et al. ...................... 705/1 |
| 5,287,270 A | 2/1994 | Hardy et al. | |
| 5,696,702 A * | 12/1997 | Skinner et al. ............... 702/178 |
| 5,717,596 A * | 2/1998 | Bernard et al. ................ 705/30 |
| 5,732,401 A * | 3/1998 | Conway ....................... 700/90 |
| 5,799,286 A * | 8/1998 | Morgan et al. ................. 705/7 |
| 5,918,219 A * | 6/1999 | Isherwood .................... 235/378 |
| 5,970,476 A * | 10/1999 | Fahey ........................... 705/28 |
| 6,055,508 A * | 4/2000 | Naor et al. ..................... 705/11 |

FOREIGN PATENT DOCUMENTS

EP 0362874 A2 * 4/1990

OTHER PUBLICATIONS

"Data Flexibility Masking", IBM Technical Disclosure Bulletin, vol. 36, No. 12, Dec. 1993, pp. 403-406.*

(Continued)

*Primary Examiner*—Hani M. Kazimi
(74) *Attorney, Agent, or Firm*—Young Law Firm, P.C.

(57) ABSTRACT

A computer implemented actual costing method for collecting and presenting an actual cost of performing a business activity includes the steps of carrying a first and/or a second step, the first step including collecting the actual cost of at least one job performed in furtherance of the business activity, the second step including collecting the actual cost of at least one item manufactured in furtherance of the business activity. A unique cost source identifier is created for each collected actual cost and the collected actual cost is stored therein. Each unique cost source identifier is then associated with its corresponding item or job within the business activity. A selected accounting costing method for actual cost collection and a selected accounting costing method for actual cost presentation based upon the stored cost source identifiers may then be implemented. As the actual discrete costs for each item or selected items manufactured and for each job or selected jobs performed in furtherance of the business activity have been collected and stored in respective unique cost source identifiers, the selected accounting costing method for actual cost collection may be different than the selected accounting costing method for cost presentation.

22 Claims, 3 Drawing Sheets

OTHER PUBLICATIONS

Downes et al.; Dictionary of Finance and Investment Terms, Fifth Ed; 1998; Barron's Educational Series, Inc.; pp. 208-208.*

Oracle Corporation, "Oracle Project Manufacturing Implementation Manual", Release 11, Mar. 1998.

* cited by examiner

METHODS AND SYSTEMS ENABLING THE IDENTIFICATION OF ACTUAL COSTS IN A TRANSACTION BASED FINANCIAL AND MANUFACTURING ENVIRONMENT

BACKGROUND OF THE INVENTION

1. Field of the Invention

This invention relates to the field of computer-implemented cost tracking and accounting systems. More particularly, the present invention relates to computer-implemented actual costing and tracking methods and systems that enable independent implementations of actual cost collection accounting methods and actual cost presentation accounting methods.

2. Description of the Related Art

Effective management of large business entities or complex projects requires that the decision-makers be provided with accurate and timely information. Inaccurate and out of date information cannot model the historical or present behavior of the entity with any degree of certainty, nor can such data provide a reliable basis for projections of future performance. Such imperfect information naturally skews the decision making process, and the company's behavior in the marketplace may not be as nimble as it might otherwise have been with more accurate and timely information.

To determine the profitability of a business requires an accurate determination of, among other factors, the cost of doing business. However, the final and total cost of performing a service or manufacturing an item is typically not ascertainable until after the all associated costs have been collected and reported, generally after the service has been performed or the item manufactured. In an attempt to overcome such limitations, a number of assumptions regarding the cost of performing a service or manufacturing an item are generally made, to allow the representation of interim costs until the final cost numbers are available. Over time, such assumptions have evolved into the so-called standard costing method, in which the cost of performing a business activity is estimated a priori. Typically, standard costs are either estimates derived from historical data collected after performing the business activity or they are the system planner's best guess as to the future cost of performing that business activity. The standard cost of performing a business activity, therefore, is generally assigned before the business activity has been undertaken. How well the standard cost assigned to a particular business activity reflects the actual cost of performing that activity is a function of, among other factors, the shrewdness of the guess, the ability of historical data to predict future behavior, the homogeneity of the activity over time, the price stability of needed resources, etc. However, even when standard costs are regularly updated, the variance between the standard cost assigned to the activity and the cost computed from historical data after the activity has been performed can be great. Such variance tends to increase when the time lag between the assignment of the standard cost and the computation of the cost after the activity has been performed is long.

This variance prevents the decision-makers from obtaining accurate and timely information as to the current cost of performing business activities, including the actual cost of labor, resources expended, items manufactured and the like. It is thus in the decision-maker's best interest to reduce this variance as much as possible. However, to do so requires the expenditure of a significant amount of resources. Indeed, to reduce the variance typically requires that the historical data (and thus the standard cost assigned to the item or job) be frequently re-evaluated, at an often-prohibitive expense. Further compounding the problem is that, in today's fluid markets, the prevailing business conditions may change even during the relatively short intervals in which the standard costs are being re-evaluated. These disadvantages of the standard costing and like accounting methods conspire to render impact analysis and recurrence work, for example, impossible, impracticable or too onerous to carry out.

Such problems are not only present at the organizational level, but also exist at lower levels within an enterprise, large company or organization. Indeed, the lack of timely and accurate information is also believed to hinder the effective management of individual departments within an organization, as well as the management of individual projects or contracts within a department or a company.

There has been a long felt need to provide decision-makers with accurate and timely information as to the current cost of performing business activities. There has also been a long felt need to provide real time or near real time actual costing information not only at an organizational level, but also across product or service lines, departments or projects and contracts. Also needed are reliable methods of collecting and presenting actual costing information regarding individual sub-operations within a job or sub-assemblies within a larger manufactured unit, as the operations are performed or the sub-assemblies manufactured.

Another consequence of the pervasive use of standard costing methods is that the choice of the cost collection accounting method drives the choice of the cost presentation accounting method. Indeed, as only approximate costing information is generated by the standard costing method, it is impracticable to present the costs differently than they were collected. For example, if a First In First Out ("FIFO") cost collection accounting method is used (e.g., in the case wherein it is desired to move old inventory first), then the same FIFO cost presentation accounting method must be used. However, it might be desirable, from a capital gains point of view, for example, to present the same costs using a LIFO cost presentation accounting method, such as when the items or services in question are becoming more expensive as time goes on. As the choice of cost collection accounting method drives the choice of cost presentation method when standard costing methods are used, such decoupling of cost collection and cost presentation accounting methods has not been possible.

What is also needed, therefore, are methods and systems to allow the de-coupling of the cost collection accounting method from the cost presentation accounting method.

SUMMARY OF THE INVENTION

An object of the present invention, therefore, is to provide decision-makers with accurate and timely information as to the current cost of performing business activities. Another object of the present invention is to provide real time actual costing information not only at an organizational level, but also across product or service lines, departments or projects and contracts. A still further object of the present invention is to provide a reliable means of collecting actual costing information regarding individual sub-operations within a job or sub-assemblies within a larger manufactured unit, as the operations are performed or the sub-assemblies manufactured. Another object of the present invention is to provide a framework and methods in which the cost collection accounting methods can be effectively de-coupled from the cost presentation accounting methods.

In accordance with the above-described objects and those that will be mentioned and will become apparent below, a computer implemented actual costing method for collecting and presenting an actual cost of performing a business activity, according to an embodiment of the present invention, comprises the steps of collecting actual costs of performing a job performed, an item manufactured and/or an item purchased in furtherance of the business activity. A unique cost source identifier is created for each collected actual cost and the collected actual cost is stored therein. Each unique cost source identifier is associated with the business activity having given rise to the collected cost. Thereafter, based upon the stored cost source identifiers, a selected accounting costing method for actual cost collection and a selected accounting costing method for actual cost presentation may be implemented. By virtue of the collected actual costs and the associated cost source identifiers, the selected accounting costing method for actual cost collection may be independent of the selected accounting costing method for cost presentation.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Hardware Overview

Figure 4:
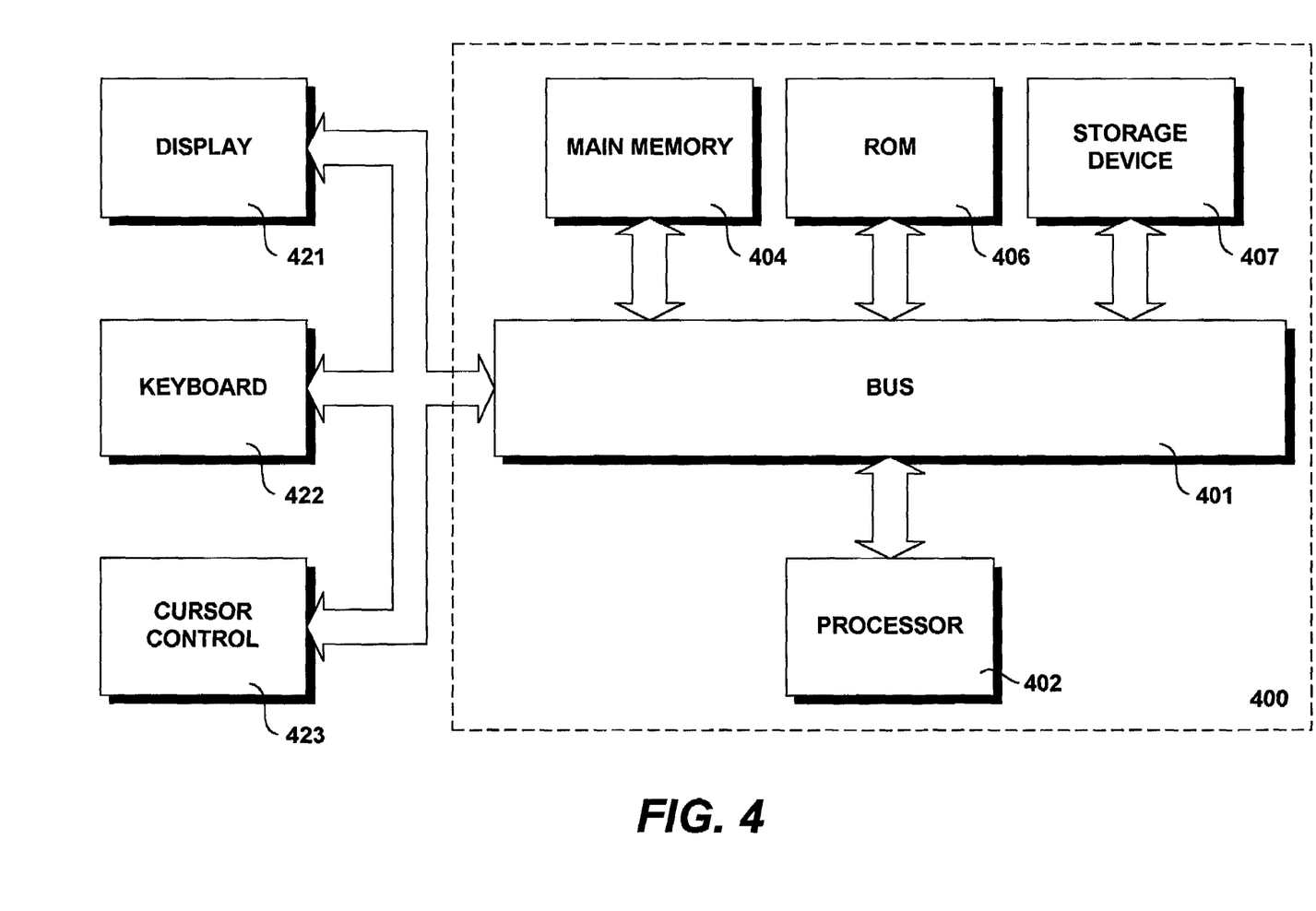
FIG. 4 illustrates a block diagram of a computer system within which an embodiment of the present invention may be implemented.

FIG. 4 illustrates a block diagram of a computer system 400 upon which an embodiment of the present invention may be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions.

Computer system 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 422 wherein all interface is provided via the stylus as a writing instrument (like a pen) and the written text is interpreted using optical character recognition (OCR) techniques.

The present invention is related to the use of computer system 400 to provide an identification of actual costs in a transaction based financial and manufacturing environment. According to one embodiment, the identification of actual costs is provided by one or more computer systems 400 in response to processor(s) 402 executing sequences of instructions contained in memory 404. Such instructions may be read into memory 404 from another computer-readable medium, such as data storage device 407. Execution of the sequences of instructions contained in memory 404 causes processor(s) 402 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

To address the aforementioned disadvantages associated with standard costing methods, the present invention aims to reduce or eliminate the time lag between the performance of a business activity and the collection of the costs associated with performance of the business activity. According to the present invention, a business activity may be most any undertaking that somehow affects the cost of the products manufactured and/or the services rendered. According to the present invention, the actual cost of manufacturing an item or performing a business activity is preferably collected contemporaneously with the manufacture of the item or the performance of the business activity. Indeed, the actual purchasing costs of items in inventory, the actual item manufacturing costs, the actual job costs or the actual costs of performing the business activity are preferably collected during or substantially immediately after the purchase of the item, the manufacture of the item, the performance of the job or the performance of the activity. The actual costs of manufacturing an item or performing a business activity may be collected at or near the location where the item is manufactured or the service performed. Alternatively, the actual costs of manufacturing an item or performing a business activity may be collected remotely.

According to the present invention, the phrases "actual cost" or "actual costs" refer to the actual monetary cost(s) of an undertaking, and generally refer to a snapshot of the current true costs associated with the undertaking or a series of undertakings, substantially as the costs are incurred or substantially immediately after they are collected. In contrast, standard costs offer the accountant or decision-maker what is frequently an inaccurate estimation of future costs based on historical data.

By identifying and collecting the actual cost of manufacturing an item or items and the actual cost of performing a business activity or activities when and where they are manufactured or performed, actual costs may be tracked at whatever level of granularity is necessary or desired. Indeed, according to the present invention, costs may be identified and collected at any level, from the cost of manufacturing a single sub-assembly of a larger device or performing a single operation within a larger job, to the cost of completing the manufacture of a large and complex machine or performing a large service contract. Toward the higher end of the granularity spectrum, the present invention allows, for example, to identify the cost per item manufactured or the cost of each operation within a larger job. For example, the cost of purchasing individual items may be separately identified and collected, as the cost of the same part or item may change with each purchase. For that reason, the individual cost of each item may be tracked and maintained individually. Toward the lower end of the granularity spectrum, the present invention allows the identification and collection of actual costs for entire projects or product lines, companies, across contracts or across any other grouping, organization or physical or legal entity. The degree of granularity, according to the present invention, is freely selectable depending upon the specific industry to which the present invention is applied, as well as the desired level of actual cost detail. For example, a manufacturer of small, individually inexpensive fungible items may not need to identify or collect information on the actual costs of manufacturing a single item, but may prefer to identify and collect the actual costs associated with manufacturing a set number of such items, such as a lot of homogeneous items. Indeed, in such a case, the reporting costs may be too high to justify the identification and collection of actual costs for each individual item, and the identification and collection of actual costs for a set number of such items may be entirely sufficient. On the other hand, for costly and unique undertakings, such as, for example, building automobiles or drilling oil wells, the identification and collection of real time or near real time actual costing data for individual items or undertakings may be paramount. The actual costs, according to the present invention, may be collected in any manner. For example, the actual costs may be contemporaneously and manually entered at the job site or may be collected by some automated actual cost collection process.

After the identification and collection of the actual cost of manufacturing an item or items and/or the identification and collection of the actual cost of performing a business activity or activities, the actual costs must be stored in some structure that allows the flexible use and reporting thereof. The present invention, to that end, utilizes a unique identifier that may be called a Cost Source Identifier, which identifier is hereafter referred to as Cost Source ID.

Figure 1A:
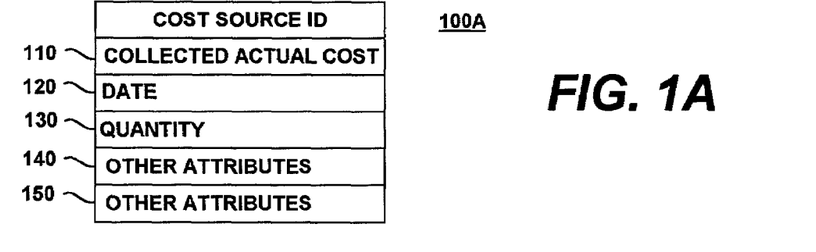
FIG. 1A shows an embodiment of a Cost Source ID structure according to the present invention.
Figure 1B:
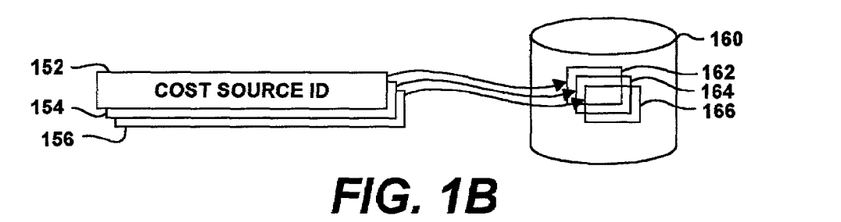
FIG. 1B shows another embodiment of a Cost Source ID according to the present invention.

An embodiment of a Cost Source ID structure is shown in FIG. 1A. As shown therein, the Cost Source ID may be a logical structure 100A that includes the identified and collected actual cost 110 of manufacturing an item or items and/or the actual cost of performing a business activity or activities. The date 120 in which the actual cost 110 is incurred may also be included in the Cost Source ID 100A, as well as the quantity 130 of items or individual services that contributed to the actual cost 110. Any number of other attributes 140, 150 may also be included in the Cost Source ID 100. Alternatively, as shown in FIG. 1B, the Cost Source IDs, such as shown at reference numerals 152, 154 and 156 may be pointers pointing to corresponding data structures 162, 164 and 166 each containing the identified and collected actual cost of manufacturing an item or items and/or the actual cost of performing a business activity or activities as well as, optionally, the date, quantity and other attributes. The data structures 162, 164 and 166 may be stored in a storage device 160 within a computer, for example. The data structures 162, 164 and 166 pointed to by the Cost Source ID pointers 152, 154, 156 may be stored in a database, such as a relational or object-oriented database. With reference to both FIGS. 1A and 1B, the Cost Source ID structures may also contain or point to a data structure containing an indication of the nature of the item or items manufactured or the service or services performed, and/or the number of unit time periods expended to perform an operation or a job.

According to an embodiment of the present invention, a new Cost Source ID is created and assigned each time a transaction occurs that affects the calculation of the actual cost for an item or service. For example, a new Cost Source ID may be created and assigned each time an item or a group of items (e.g., a lot or other grouping of homogeneous items) is received in inventory. A new Cost Source ID may also be assigned after the completion of each operation or selected operations in a multi-operation job. Therefore, a job having multiple constituent operations or a manufactured item having a plurality of sub-parts or sub-assemblies may be assigned a corresponding plurality Cost Source IDs. Each Cost Source ID, then, will include or point to a data or other logical structure that includes at least the actual cost for that sub-part, sub-assembly or operation. Preferably, each Cost Source ID will also include or point to a structure that includes the date in which the item or items were manufactured or the service or services performed. According to the present invention, therefore, unique Cost Source IDs may be created and assigned at least as items are purchased, manufactured, received into inventory, moved from one inventory group into another (e.g., sub-inventory transfers, for example) or as services are performed. An item of manufacture including a plurality of sub-parts or sub-assemblies or a service including a plurality of sub-operations, therefore, may accumulate a plurality of Cost Source IDs during its manufacture or during its performance. Each such Cost Source ID preferably includes or points to a structure that includes at least the actual cost of a sub-part or sub-assembly of the item manufactured or a sub-operation of the service performed.

One of the advantages of tracking actual costs using Cost Source IDs according to the present invention is that the calculation of the actual cost is carried out in real time or near real time, and reflects the present actual cost of manufacturing, purchasing or otherwise modifying an item or items of manufacture or the present actual cost of performing a service or services. Another advantage is that the assigned Cost Source ID follows the item as it is manufactured or follows the job as it is carried out. Specifically, as an item moves from one manufacturing stage to the next, it may accumulate unique Cost Source IDs at each stage of manufacturing. In this manner, a plurality of unique Cost Source IDs may become associated with the completed item, thereby allowing a detailed picture of the actual costs of manufacturing the item at any stage of manufacturing. Similarly, a plurality of unique Cost Source IDs may become associated with the completed job, thereby allowing a detailed picture to be obtained of the actual costs of performing the job at any stage of the performance thereof.

By virtue of such accumulated Cost Source IDs, a detailed, real time or near real time snapshot of the actual costs of manufacturing an item or performing a service may be gained by rolling up the actual costs included or pointed to by each of the Cost Source IDs associated with the item or service. For example, to obtain a snapshot of the actual costs of manufacturing an item at a $6^{th}$ stage (out of 10, for example) of manufacturing, the Cost Source IDs for stages 1 through 6 may be accessed, and the actual costs stored therein or pointed to by the Cost Source IDs for stages 1 through 6 may be accumulated (e.g., added). Likewise, the Cost Source IDs may be utilized after the performance of the service or the manufacturing of the item is completed, to gain insight as to the actual costs of carrying out the business activity in question as of any selected date or manufacturing or performance stage.

The Cost Source IDs associated with an item or a job may be organized in a logical structure modeled, for example, after the manufacturing process or the steps defining the performance of a job. That is, the organization of the Cost Source IDs according to the present invention may follow the same organization as the manufacture of the underlying item or the performance of the underlying job. For example, the Cost Source IDs may be organized as a hierarchical structure modeled on the manufacturing process or modeled on the order of constituent operations of the job to be performed. The actual cost data, as well as the other data associated with the Cost Source IDs may be included in the hierarchical structure itself or may be included in other logical structures pointed to by each of the Cost Source IDs.

Figure 2:
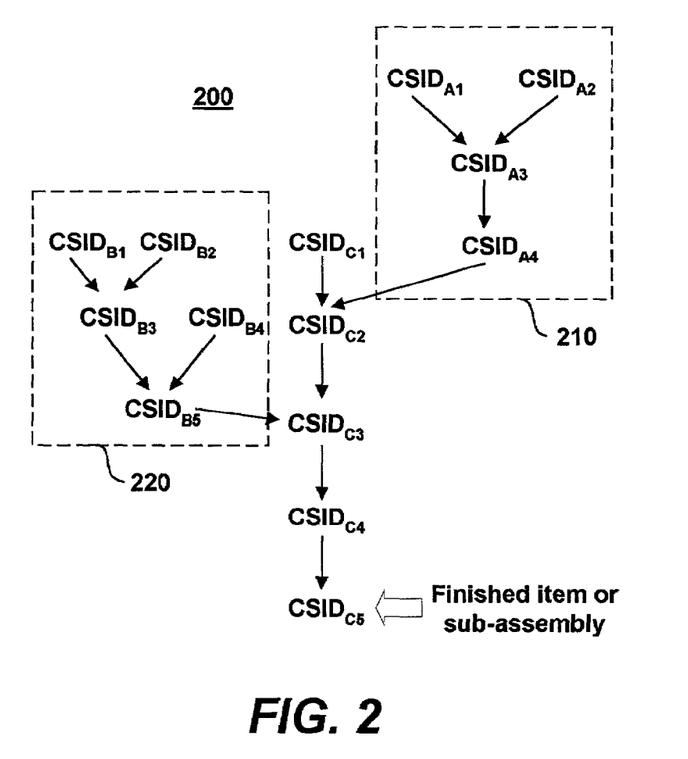
FIG. 2 depicts one possible logical organization of the Cost Source ID structures, according to an embodiment of the present invention.

An example of such an organization is shown in FIG. 2. FIG. 2 shows a hierarchical structure 200 of Cost Source IDs according to the present invention, wherein the hierarchical structure is organized in a manner similar to that of the underlying manufacturing process. The manufacturing process in this example has fourteen steps. As shown in FIG. 2, the item to be manufactured includes two sub-assemblies, referenced as numerals 210 and 220. Sub-assembly 210 is manufactured in four separate operations, and each operation is assigned a new unique Cost Source ID, labeled CSID in FIG. 2. Indeed, sub-assembly 210 is manufactured by joining (or fabricating, purchasing, modifying, taking from inventory etc.) parts or sub-assemblies A1 and A2 (parts or sub-assemblies in FIG. 2 are referenced as subscripts) to produce part or sub-assembly A3. Each of the parts or sub-assemblies A1, A2 and A3 is associated with a unique Cost Source 1D, namely $CSID_{A1}$, $CSID_{A2}$ and $CSID_{A3}$, respectively. The Cost Source IDs of FIG. 2 may include an indication of the actual cost of manufacturing the item or sub-assembly, which actual cost may include, for example, contributions from the cost of the labor expended to produce the part, overhead, inventory costs, the cost of any outside processing and/or the cost of the materials used to produce the part. Part A3 may then be undergo a further manufacturing step to produce the part referenced in FIG. 2 as subscript A4. As with parts or sub-assemblies A1 through A3, A4 also has a Cost Source ID associated therewith, namely, $CSID_{A4}$. Similarly, sub-assembly or part 220 is produced by processing parts B1 and B2 to produce part or sub-assembly B3, which is itself coupled, as shown in the example of FIG. 2, to part B4 to produce part or sub-assembly B5. Each of the parts B1 through B5 has a respective unique Cost Source ID $CSID_{B1-B5}$ associated therewith that is indicative of the actual cost of producing or somehow processing the part or sub-assembly. To produce the finished part or sub-assembly C5, parts or sub-assemblies C1 and A4 are joined, for example, to produce part or sub-assembly C2. Part C3, produced after some operation on part C2, is coupled, joined, or otherwise connected, in this example, to sub-assembly B5 from 220 to produce part or sub-assembly C4. Part C4, in turn, is then modified or otherwise operated on to produce part C5, which is the finished part, item or sub-assembly. Each of the aforementioned parts or sub-assemblies C1 through C5 has a corresponding Cost Source ID associated therewith, labeled in FIG. 2 as $CSID_{C1-C5}$. Therefore, the organization of the Cost Source IDs according to the present invention may be modeled on the underlying physical structure of the item to be manufactured and/or on the sequence of the operations to be carried out to complete the service. It is to be noted that the organization of Cost Source IDs shown in FIG. 2 is but one example of the manner in which the Cost Source ID structures may be organized according to the present invention.

With reference to FIG. 2, to obtain the actual cost of producing part B5, for example, it is only necessary to roll up the actual costs associated with all hierarchically lower-level parts associated with part B5. As shown in FIG. 2, the actual cost of producing item B5 may be obtained by accumulating the actual costs included or pointed to by the structures $CSID_{B1}$, $CSID_{B2}$, $CSID_{B3}$, $CSID_{B4}$ and $CSID_{B5}$. Indeed, by creating and assigning a new Cost Source ID at each stage of a business activity, the actual costs of carrying out the business activity may readily be ascertained at any operational stage. Other logical hierarchical structures suitable to organizing the Cost Source IDs according to the present invention and other structures are disclosed in the commonly assigned and co-pending U.S. patent application 09/234,964 entitled "Generic Hierarchical Data Structure With Hard-Pegging Of Nodes With Dependencies Implemented In A Relational Database", the disclosure of which is incorporated herewith in its entirety.

The Cost Source IDs, as noted above, may be assigned at any desired level of granularity. For example, the manufacturer of item C5 may not require that the actual cost of the item be ascertainable at each and every stage of processing, as shown in FIG. 2. Indeed, the transaction costs of identifying and collecting such detailed costing information may be outweighed by the usefulness of the information. In that case, it may be advisable to identify and to collect actual costing information on only the major sub-components of part C5, such as parts or sub-assemblies 210 and/or 220. The present invention, therefore, allows as fine grained calculation of actual costs as is desired and/or commercially desirable. Although FIG. 2 has been described in terms of the manufacturing of part or sub-assembly C5, the present invention is equally applicable to, for example, the actual costs of performing complex services, and each node of the tree structure of FIG. 2 may represent a single or multiple operations within a larger job. Alternatively, a tree-like structure similar to that shown in FIG. 2 may represent contractor-subcontractor relationships, a corporate organizational chart, individual departments or companies, different clients etc. The Cost Source IDs may be organized in tables in relational or object-oriented databases, for example, as suggested by FIG. 1B. Other uses, structures, organizations and storage schemes for the Cost Source ID according to the present invention will no doubt occur to those of skill in this art and all such uses, structures, organizations and storage schemes are deemed to fall within the scope of the present invention. For example, the Cost Source ID depicted in FIG. 2 may be stored as a linked list of Cost Source ID logical structures or pointers.

The use of Cost Source IDs, according to the present invention, brings about other advantages, relative to cost accounting methods. Indeed, the use of the standard costing method conventionally meant that the choice of cost collection and/or item picking accounting methods dictated the choice of cost presentation accounting methods. Conventionally, for example, if the selected costing collection accounting method was FIFO, then the cost presentation accounting method was also required to be the FIFO cost presentation accounting method. According to the present invention, however, because actual costing data is available and readily accessible through the Cost Source ID structures, potentially down to the item, sub-assembly or operation level, the cost presentation accounting method may be wholly decoupled from the cost collection accounting method. Indeed, according to the present invention, the accounting method selected for cost collection may be different and independent of the accounting method selected for cost presentation.

The actual costing methods and systems according to the present invention acknowledge that the manner in which businesses operate may be entirely independent of the manner in which they make money (e.g. calculate and report profits and/or losses). Similarly, according to the present invention, the picking rule may also be independent of the accounting method selected for cost presentation. In an illustrative example, a business may prefer to pick (use or withdraw) older items from inventory (using a FIFO picking rule) before picking items that have more recently been added to inventory. This may be due, for example, to limited shelf life for the item or items in question or this preference may be due to rising prices for similar items over time. From an operational point of view, therefore, it may be wise to use older inventory before using newer inventory. However, from an accounting point of view, it may be more profitable to report the use of newer inventory items first, using a LIFO cost presentation accounting method. Without the actual costing data included in or pointed to by the Cost Source IDs according to the present invention, decoupling the picking rule and the cost presentation accounting method would not be possible, for lack of meaningful data on which to base the decision and/or the accounting formulae. For example, were a standard costing method to be adopted instead of implementing an embodiment of the present invention, the specific actual costing data and date information required to, for example, collect cost using a FIFO method and to present costs using a LIFO method, would be unavailable. Indeed, if a standard cost of, for example, $0.10 per item were to be pre-assigned to each of a group of homogeneous items regardless of the actual cost of acquiring these items, the decoupling of cost collection and cost presentation accounting methods would be impossible, as no data would be available to make any meaningful distinction between the items' actual costs.

Figure 3:
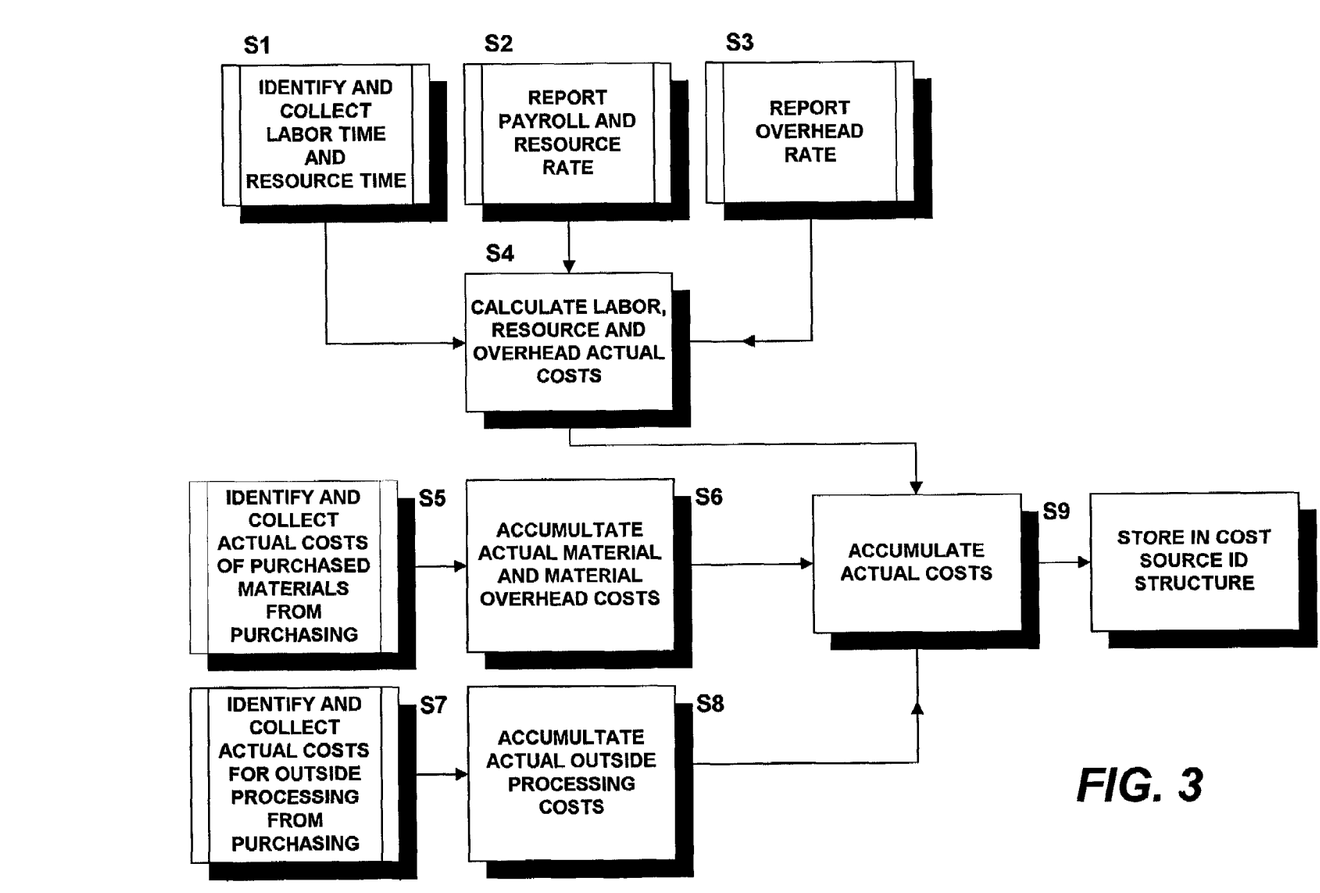
FIG. 3 is a flow chart of cost identification and collection activities, according to an embodiment of the present invention.

The actual cost of carrying out any given business activity is likely to include, for example, the costs of one or more of the following variables: labor, resources, overhead, materials and outside processing costs. FIG. 3 shows an embodiment of a method for identifying, collecting and storing such costs in Cost Source ID structures according to the present invention. In step S1, the labor time and resource time (e.g., number of unit time periods, such as hours, minutes, etc.) expended on a particular operation, job or item manufacture is identified and collected. The resource time, for example, may be a measure of the usage of a particular piece of equipment necessary to carry out the operation, job or manufacture. In step S2, the actual payroll and resource rates are reported. Step S3 calls for a report of the overhead rate that may include, for example, utilities, warehousing costs, rent and the like. The results of steps S1, S2 and S3 may then be used to calculate actual labor, resource and overhead costs, either as separate costs or as an aggregate actual cost as shown in FIG. 2. Step S5 identifies and collects the actual costs of purchased materials, and step S7 identifies and collects the actual costs expended for outside processing, if any. Preferably, the actual costs identified and collected in steps S5 and S7 are collected from, for example, the purchase orders for these items, as such documents reflect the actual costs paid for the materials and for the outside processing, respectively. The actual costs for materials overhead may be also identified and collected in step S5, if desired. Step S6 accumulates the actual material and material overhead costs, whereas step S8 accumulates the cost or costs of outside processing necessary for the performance of the operation, job or item manufacture. The actual costs calculated and accumulated in steps S4, S6 and S8 are then accumulated (e.g., added) in step S9 and the result thereof may then be stored in a unique Cost Source ID structure according to the present invention as shown in FIG. 1A, or in the data structure pointed to by the Cost Source ID pointer according to the present invention, as shown in FIG. 1B.

It is to be understood that the method outlined in FIG. 3 is but one example of methods for identifying, collecting and calculating the actual costs of carrying out a business activity. Indeed, the order of the steps shown in FIG. 3 may and preferably should be adapted to the particular business activity contemplated. Similarly, some of the steps shown in FIG. 3 may be omitted, and other steps may be readily added thereto. Other changes will occur to those of skill in this art, and all such modifications should be deemed to fall within the scope of the present invention. Indeed, any method of identifying and collecting actual costs may be implemented, and the result thereof stored in one or more Cost Source ID structures according to the present invention.

In cases wherein actual costs are unknown, a standard cost may be assigned to any transaction that affects the cost of an item or the performance of a service. When standard costs are used, a Cost Source ID is created and the standard cost for the item or the service is stored in the Cost Source ID data structure or in the data structure pointed to by the Cost Source ID. This avoids, for example, including items of unknown cost in inventory. Moreover, standard overhead rates may be used, for example, in step S3 of FIG. 3. In step S3, a standard cost must often be used, as it may be impossible or unduly burdensome to attempt to estimate the useful life of a machine or other equipment. For example, the number of usage cycles over the life of some assets (such as a drilling machine, for example) generally cannot be predetermined. In such cases, according to the present invention, a standard cost for the use of the asset may be determined and applied as overhead. Other uses for standard costs within the context of the present invention will also no doubt occur to those of skill in this art. For example, the standard cost may be used when the transaction costs associated with the identification and collection of actual costs are too high relative to the value of the item manufactured or the service rendered. However, for assets whose useful life span and/or number of usage cycles is predetermined, then actual usage costs are applied. For overhead costs such as rent and utilities, the actual cost may be pro-rated and included in the appropriate Cost Source ID data structure or in the data structure pointed to by the Cost Source ID.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A computer implemented actual costing method for collecting and presenting an actual cost of manufacturing an item or performing a service, comprising the steps of:

collecting actual costs of performing a job, manufacturing an item and/or purchasing an item, creating a unique cost source identifier data structure for each collected actual cost, each created cost source identifier data structure including a plurality of attribute fields;

populating one the plurality of attribute fields of the created cost source identifier data structure with the collected actual cost;

storing the populated cost source identifier data structure in a memory of a computer;

associating each unique cost source identifier data structure to a step carried out while manufacturing the item or while performing the service; and organizing and storing the cost source identifier data structures within the computer as a hierarchical structure that is modeled on;

a structure of the item manufactured or a sequence of operations carried out while performing the service;

implementing a selected accounting casting method for actual cost collection and a selected accounting costing method for actual cost presentation by accessing and selectively traversing the hierarchical structure, the selected accounting costing method for actual cost collection being independent of the selected accounting costing method for cost presentation.

2. The method of claim 1, wherein the accounting costing methods for actual cost collection and for actual cost presentation are selected from among a group including Last In First Out (LEFO), First In First Out (FIFO), Most Expensive First (MEF), Least Expensive First (LEF) and Average costing methods.

3. The method of claim 1, wherein a new unique cost source identifier data structure is created upon each occurrence of a transaction that affects the actual cost of the activity that gave rise to the collected actual cost.

4. The method of claim 1, wherein a new unique cost source identifier data structure is created at least each time an item is manufactured or purchased and each time an item is received into inventory.

5. The method of claim 1, wherein a new unique source identifier data structure is created at least each time a job is performed while manufacturing the item or while performing the service, contemporaneously with a perfomance of the job.

6. The method of claim 1, wherein the unique cost source identifier data structure is further configured to store a pointer to a data structure.

7. The method of claim 1, wherein the plurality of attribute fields are configured to store at least one of an indication of a date at which the collected actual cost was incurred, a quantity of items corresponding to the collected actual cost, a number of unit time periods expended in performance of a job, an indication of labor time, resource time, payroll, resource rate, overhead time, overhead rate, actual cost of purchased material and actual cost of outside processing.

8. The method of claim 1, wherein the hierarchical structure includes a plurality of nodes, each of the stored cost source identifier logical structures being assigned to at least one of the plurality of nodes.

9. The method of claim 7, wherein the implementing step is carried out at a selected node level by rolling up all actual costs within the cost source identifiers assigned to nodes hierarchically below the selected node level.

10. The method of claim 1, further comprising the step of storing a standard cost within the cost source identifier when an actual cost of one of a job performed and an item manufactured is unknown.

11. A computer system to compute an actual cost of manufacturing an item or performing a service from collected actual costs incurred while manufacturing the item or performing the service, comprising;

at least one processor;

at least one data storage device coupled to the at least one processor;

a plurality of processes spawned by said at least one processor, the processes including processing logic for:

collecting actual costs of performing a job, manufacturing an item and/or purchasing an item, creating a unique cost source identifier data structure for each collected actual cost, each created cost source identifier udata structure including a plurality of attribute fields;

populating one of the plurality of attribute fields of the created cost source identifier data structure with the collected actual cost;

storing the populated cost source identifier data;

associating each unique coat source identifier data structure to a step carried out while manufacturing the item or while performing the service; and organizing and storing the cost source identifier data structures as a hierarchical structure tat is modeled on:

a structure of the item manufactured, or a sequence of operations carried out while performing the service;

implementing a selected accounting costing method for actual cost collection and a selected accounting costing method for actual cost presentation by accessing and selectively traversing the hierarchical structure, the selected accounting costing method for actual cost collection being independent of the selected accounting costing method for cost presentation.

12. The computer system of claim 11, wherein the hierarchical structure includes a plurality of nodes, each of the stored cost source identifiers being assigned to at least one of the plurality of nodes.

13. The computer system of claim 12, wherein said at least one processor implements the selected accounting method for actual cost presentation and the selected accounting method for actual cost collection by rolling up all actual costs within the cost source identifiers assigned to nodes hierarchically below the selected node level.

14. The computer system of claim 11, further comprising processing logic for storing said cost source identifier data structures in one of a relational or an object-oriented database.

15. A machine readable medium having stored thereon data representing sequences of instructions which, when executed by a computer system, causes said computer system to perform the steps of:

collecting, in substantially real time, an actual cost of each of a plurality of constituent items or operations affecting a cost of manufacturing an item or performing a service;

creating a unique cost source identifier data structure for each collected actual cost, each created cost source identifier data structure including a plurality of attribute fields;

populating one of the plurality of attribute fields of the created cost source identifier data structure with the collected actual cost;

assigning each collected actual cost to a unique logical structure associated with a corresponding one of said items or operations;

storing each populated cost source identifier data structure to create a hierarchical organization of cost source identifier data structures configured to allow the actual cost of the activity to be ascertained at any stage of a performance thereof, the hierarchical organization being modeled on a structure of the item manufactured or a sequence of steps carried out while performing the service.

16. The machine readable medium of claim 15, further comprising sequences of instructions for performing the step of creating a new unique cost source identifier data structure for each constituent item or operation that affects the cost of manufacturing the item or performing the service.

17. The machine readable medium of claim 15, wherein one of the plurality of attribute fields is configured to store a pointer to a data structure.

18. The machine readable medium of claim 15, wherein the sequences of operations further cause said computer system to carry out a step of storing a date in which each collected actual cost is incurred.

19. The machine readable medium of claim 15, wherein the sequences of operations further cause said computer system to carry out a step of storing a standard cost when an actual cost cannot be ascertained.

20. The machine readable medium of claim 15, wherein the sequences of operations further cause said computer system to carry out a step of storing a standard cost when a transaction cost of collecting the actual cost for any one of said constituent items or operations is excessive relative to a value thereof.

21. The machine readable medium of claim 15, wherein the storing step stores the hierarchical organization of cost source identifier data structures in one of a relational and an object-oriented database.

22. The machine readable medium of claim 15, further comprising sequences of instructions for performing the step of:

accessing the hierarchical organization of cost source identifier data structures, and implementing a selected actual cost collection accounting method and a selected actual cost presentation accounting method based on the accessed hierarchical organization of cost source identifier data structures, the selected actual cost collection accounting method being independent of the selected actual cost presentation accounting method.

* * * * *

UNITED STATES PATENT AND TRADEMARK OFFICE
CERTIFICATE OF CORRECTION

PATENT NO. : 7,440,909 B2　　　　　　　　　　　　　　　　　　　Page 1 of 2
APPLICATION NO. : 09/235120
DATED : October 21, 2008
INVENTOR(S) : Arvind Nath Puri, Deepak Vij and Galina Atlas Patil It is certified that error appears in the above-identified patent and that said Letters Patent is hereby corrected as shown below:

Title Page item 56 - Col. 2.
On second page, under (56) References cited, "OTHER PUBLICATIONS", insert:

--Oracle Corporation, "Oracle Cost Management User's Guide", Release 11, March 1998. Oracle Corporation, "Oracle Project Manufacturing User's Guide", Release 11, March 1998.--

In claim 1
Col. 11, line 18, replace
"is modelled on;" with
--is modelled on:--

Col. 11, line 22, replace
"implementing a selected accounting casting method for" with
--implementing a selected accounting costing method for--

In claim 2
Col. 11, line 32, replace
"Out (LEFO), First In First Out (FIFO), Most Expensive First" with
--Out (LIFO), First In First Out (FIFO), Most Expensive First--

In claim 11
Col. 12, line 18, replace
"tifier udata structure including a plurality of attribute" with
--tifier data structure including a plurality of attribute--, and

UNITED STATES PATENT AND TRADEMARK OFFICE
CERTIFICATE OF CORRECTION

| | |
|---|---|
| PATENT NO. | : 7,440,909 B2 |
| APPLICATION NO. | : 09/235120 |
| DATED | : October 21, 2008 |
| INVENTOR(S) | : Arvind Nath Puri, Deepak Vij and Galina Atlas Patil |

It is certified that error appears in the above-identified patent and that said Letters Patent is hereby corrected as shown below:

Col. 12, line 29, replace
"tures as a hierarchical structure tat is modelled on:" with
--tures as a hierarchical structure that is modelled on:--

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,440,909 B2 | Page 1 of 1 |
| APPLICATION NO. | : 09/235120 | |
| DATED | : October 21, 2008 | |
| INVENTOR(S) | : Puri et al. | |

It is certified that error appears in the above-identified patent and that said Letters Patent is hereby corrected as shown below:

In column 7, line 44, delete "1D," and insert -- ID, --, therefor.

In column 8, line 42, delete "fine grained" and insert -- fine-grained --, therefor.

In column 11, line 7, in claim 1, delete "one" and insert -- one of --, therefor.

In column 11, line 47, in claim 5, delete "perfomance" and insert -- performance --, therefor.

In column 12, line 8, in claim 11, delete "comprising;" and insert -- comprising: --, therefor.

In column 12, line 24, in claim 11, delete "coat" and insert -- cost --, therefor.

Signed and Sealed this

Twentieth Day of April, 2010

David J. Kappos
*Director of the United States Patent and Trademark Office*